Dec. 8, 1959     H. W. RINGMAN     2,915,851
DUCK CALL
Filed Dec. 3, 1956
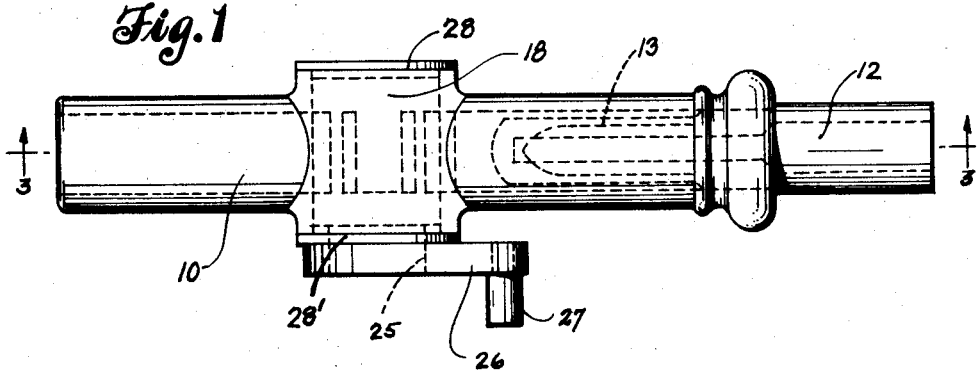
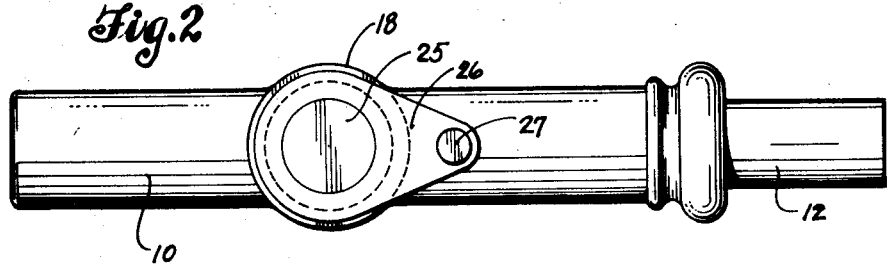
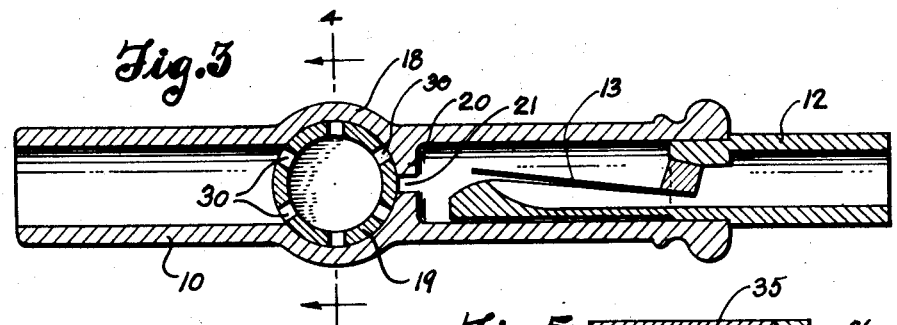
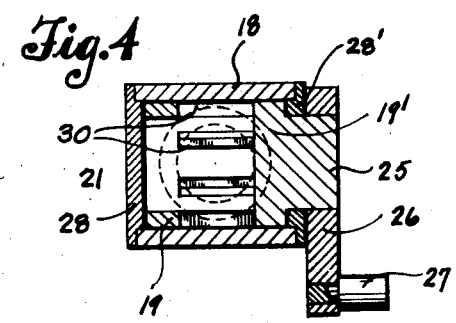
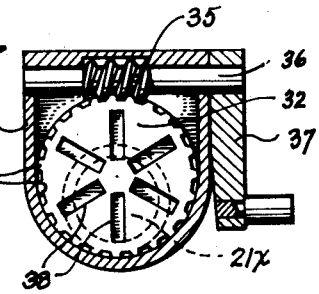
INVENTOR.
HENRY W. RINGMAN
BY
Robinson & Berry
ATTORNEYS

United States Patent Office 2,915,851
Patented Dec. 8, 1959

2,915,851

DUCK CALL

Henry W. Ringman, Everett, Wash.

Application December 3, 1956, Serial No. 625,860

2 Claims. (Cl. 46—180)

This invention relates to those devices generally designated by hunters as "duck calls," and which are used by them to produce a call that will attract flying ducks and induce them to fly within shooting range. More specifically, the present invention has reference to improvements in duck calls of those types wherein a reed is contained and is caused to vibrate incident to the user blowing through the tubular housing or barrel in which the reed is functionally mounted.

It is the principal object of this invention to provide a duck call of the above stated character that is equipped with a novel valve mechanism that can be operated as the user of the duck call blows through the reed holding barrel, to effect the production of a rapid succession of short stacatto tones simulating the rapid quacking of ducks which is characteristic of them when feeding.

It is also an object of the present invention to provide a duck call that is equipped with a rotary or moving valve mechanism, as above stated, which also may be set for use of the call in the usual way to produce the sound of the usual quack, or variations thereof, as produced by the hunter by the deft use of his hands applied about the outer end of the barrel of the device.

It is also an object of the present invention to provide a duck call of the above stated character wherein the valve is of a rotary character and easily operated by the user.

In accomplishing the above mentioned and other objects of the invention, I have provided the improved details of construction, the preferred forms of which are illustrated in the accompanying drawings, wherein:

Fig. 1 is a top, or plan view of a duck call embodying the improvement of the present invention therein.

Fig. 2 is a side view of the device.

Fig. 3 is a longitudinal, vertical section of the present duck call, taken on the line 3—3 in Fig. 1.

Fig. 4 is a cross-section through the valve and valve containing portion of the device, taken on line 4—4 in Fig. 3.

Fig. 5 is a cross-sectional detail of a duck call embodied by the present invention but showing an alternative form of rotary valve device.

Referring more in detail to the drawings:

The present duck call comprises a tubular housing, or barrel, 10 which contains the reed and through which the user blows to produce the intended duck attracting call; this being done by placing the inner end of the barrel in his mouth and blowing. Removably fitted in the opposite, or outer end portion of the barrel is a tubular extension 12 constituting the reed holder which is of a present day well known type used by hunters; this holder 12 having a reed 13 fixed therein and extended along the recessed inner end portion thereof as shown in Fig. 3, and in such manner that blowing through the tube will cause the reed to vibrate and produce a tone which can be varied in pitch and sound by the user upon placing the cupped hands about the outer end portion of the reed holder. Since the holder 12 and reed 13 here shown, considered per se, are not patentably new, they will not be further described. Furthermore, it is to be understood that any sound producing means that is suitable for this use and similarly operated can be employed in this duck call and it is not intended that the present invention be confined to or require use of any specific form of reed or reed holder so long as their use is effected in a similar way and not inconsistent with the objects of the present invention.

Medially of its ends, the housing or barrel 10 is formed with an integral, transversely directed cylindrical valve housing 18 having an inside diameter that is slightly greater than that of the barrel and in which a cylindrical valve 19 is rotatably fitted. At its mouth piece side, this transversely directed valve housing 18 is open to the full cross-sectional dimensions or diameter of the inside of the barrel 10, as noted in Fig. 3, but at its opposite side it is closed by a wall 20. This wall is formed in the axial line of the barrel with a small air passage or port 21.

It is shown in Fig. 3 that the rotary valve member 19 is cylindrical, and in Fig. 4 it is shown to extend through the barrel. It is also seen in Fig. 4 to be closed at one end by a solid wall 19' from which a short stem 25 extends, and to which stem the hub portion of a crank arm 26 is fitted and secured, and at its end the crank arm is equipped with a knob 27. The opposite end of the cylindrical valve housing 18 is closed by a disk-like plate 28 that is press fitted and secured therein, and a similar disk 28' is press fitted in the other end of the housing 18 and through this disk the stem 19 rotatably extends. The wall of the cylindrical valve 19 is formed at equally spaced intervals circumferentially thereof with narrow longitudinally directed slots 30, each in such position that it will be caused to pass across the open channel of the mouth piece end of the barrel and also to individually pass across the port 21 as the valve is rotated. It is further to be observed that the spacing of the slots in the valve is such that at all times at least one of them is exposed to the mouth piece end passage of the barrel.

With the valve mechanism so arranged in the device, it will be understood that if the valve is rotated as the user blows into the barrel, a blast of air will be discharged through port 21 each time a slot 30 in the valve passes thereacross. Thus, assuming that the valve is being rotated in the intended manner, the result will be a rapid succession of quacking sounds produced by the reed, simulating those of ducks when feeding; the rapidity of these sounds varying with the rate of rotation of the valve. However, if the hunter wishes to give the usual duck call, which is a rather sustained note, varied with the placement and manipulation of the hands over the reed holder, he merely sets the valve at an open position that permits a steady blast of air to be driven against the reed.

It is further to be explained that each time the rotating valve 19 operates to cut off the flow of air through the port 21, air pressure is built up within the valve chamber, and then when a valve slot 30 moves across the discharge port 21, the air under pressure is expelled therethrough with additional force that results in a sharp stacatto tone being produced by the reed 13 that simulates the sound produced by a duck.

In Fig. 5, I have shown another form of valve mechanism for effecting a similar result. In this showing a valve disk 32 is rotatably fitted in a chambered portion 18x of the housing, transversely of the axis of the barrel. This disk is formed with peripheral gear teeth 34 with which a worm gear 35 meshes; the gear 35 being fixed to a transversely directed shaft 36 equipped with a turning crank 37. Formed radially of the disk at equally spaced intervals is a succession of slots 38 adapted to pass by an airport 21x in the forward wall of the chamber, opening into the forward end portion of the tubular barrel 10.

It will be understood that rotation of the disk 32, while blowing into the barrel in the usual way, will result in the producing of a rapid succession of quacking sounds as produced by the device of Fig. 3.

Devices of the kinds above described may be put to other uses than that mentioned, for giving various bird or animal calls, and by the use of the valve, and hands and by controlled blowing, the calls may be varied to considerable extent.

Such devices are simple in construction, easy to use, and relatively inexpensive, and may be made in various exterior designs without departing from the spirit of the invention.

I claim:

1. A duck call comprising a tubular housing having an open mouth end portion for use in blowing through the housing, means applied within the opposite end portion of said tubular housing for producing a tone incident to being impinged by air blown thereagainst, and a rotary valve member mounted in said housing between said mouth end portion and the sound producing means with means extended therefrom for its controlled manual rotation; said rotary valve member having an air storage chamber therein which is in constant communication with the mouth end portion of the housing and which chamber has openings in spaced relationship circumferentially of the valve that provide for the intermittent discharge of air from said chamber against the sound producing means as said valve member is rotated.

2. A duck call comprising a tubular housing having a mouth end portion for use in blowing through the housing, a reed mounting means applied within the opposite end portion of the housing and a reed mounted thereby for producing a duck calling tone when air is blown through the housing, a cylindrical valve housing formed in and as a part of said tubular housing, transversely thereof and between its mouth end and said reed mounting means, a cylindrical valve member rotatably fitted in said valve housing, and means extended from said member for its manual rotation; said cylindrical valve housing being open at one side to the mouth end portion of said tubular housing, and having a small discharge port at its opposite side opening to the reed containing portion of said tubular housing, and said cylindrical valve member having slots formed therein, equally spaced thereabout and longitudinally thereof, and in such spaced relationship that at least one of them will be in communication at all times during rotation of the valve with the mouth end portion of the tubular housing, and which slots will successively and intermittently pass said discharge port as the valve is rotated to effect the intermittent application of operating air to the reed.

References Cited in the file of this patent
UNITED STATES PATENTS

| | | |
|---|---|---|
| 400,123 | Schoenner | Mar. 26, 1889 |
| 1,814,730 | Myers | July 14, 1931 |
| 2,551,367 | Fahey | May 1, 1951 |
| 2,555,833 | Vanaman | June 5, 1951 |
| 2,782,558 | Harley | Feb. 26, 1957 |